Dec. 17, 1968  R. DIETRICH ETAL  3,416,422

PHOTOGRAPHIC CAMERA WITH FLASH UNIT

Filed Feb. 28, 1966  2 Sheets-Sheet 1

United States Patent Office 3,416,422
Patented Dec. 17, 1968

3,416,422
PHOTOGRAPHIC CAMERA WITH FLASH UNIT
Rolf Dietrich and Hans Ruhle, Stuttgart, and Helmut Ebertz, Stuttgart-Mohringen, Germany, assignors to Zeiss-Ikon Aktiengesellschaft, Stuttgart, Germany, a corporation of Germany
Filed Feb. 28, 1966, Ser. No. 530,426
Claims priority, application Germany, Mar. 4, 1965, Z 11,382
5 Claims. (Cl. 95—11)

ABSTRACT OF THE DISCLOSURE

A photographic camera having a viewfinder above which is arranged an accessory shoe for receiving a flash unit containing a test lamp. The camera and the flash unit are provided with aligned apertures and a light ray deflecting device for rendering the light of the test lamp visible in the finder when the flash unit is inserted in the accessory shoe. As an alternative, the viewfinder may be provided with a secondary lamp which is electrically connected to the test lamp of the flash unit and illuminated in response to insertion of the flash unit into the accessory shoe.

---

This invention relates to a photographic camera equipped with a flash unit, and particularly with an electronic flash unit, preferably of the type to be slidably mounted into the accessory shoe provided in the camera.

In general, flashing of an electronic unit is effected by discharging a capacitor through an electronic flash lamp. In order to be able to produce a flash, the capacitor must first be charged and this requires a certain time. Thus, it is impossible to take flash snap-shots consecutively at a higher rate than the recharging duration of the capacitor will permit. In order to be able to take pictures as fast as possible, it is important to recognize the instant when the capacitor is sufficiently recharged. To indicate the state of charge, electronic flash units or "speedlights" are usually equipped with a test lamp that will light up when a sufficient charge is reached in the capacitor, because then the capacitor will have a certain sufficient potential. However, in flash equipment presently known, the light of the test lamp can only be seen on the flash unit itself, and when this is in place on the camera, the camera user must move the camera away from his eye to check for flash readiness. Such procedure delays the taking of a subsequent picture further, because the camera must be reoriented on the subject to be photographed every time. This is not only cumbersome and time consuming, but makes impossible exposures in short sequence whenever such action would be valuable or desirable.

It is an object of the present invention to avoid unnecessary delay in the sequence of flash exposures by providing means that make it possible to see the light of the test lamp, with the flash unit set on the camera, when looking into the view finder. For this purpose, the camera housing is preferably provided with an opening near the location where the flash unit is to be set so that light of the test lamp can be directed into the opening. In a suitable manner, the opening extends to a point near the light passage of the finder and the light of the test lamp entering the opening is here deflected by proper means, mirrors, prisms or the like, into the direction toward the finder eyepiece.

In guiding the light of the test lamp into the bore of the camera provided therefor, a light conducting rod may be employed. These light conducting means may be arranged either within the flash unit itself or, particularly when to be installed on present equipment, can be mounted outside the housing of the unit. However, a light conductor may not be necessary when locating the test lamp near the bottom of the flash unit so that a light duct, a translucent or transparent bottom or the like will suffice to let light of the test lamp reach the respective opening in the camera housing when the flash unit is in place and its capacitor charged. Depending on the position of the test lamp in the flash unit, the opening in the camera wall for admitting light of the test lamp will have to be near the flash unit mounting shoe. Such an arrangement may render it advantageous to provide a suitable opening in this shoe or make the shoe of light-permeable material in order to obtain a free light passage.

It is advisable to protect the opening for admitting test lamp light into the finder, against dust and/or stray light, when the flash unit is not used and has been taken off, by a cover that is moved in place upon removal of the flash unit.

The hole in the camera wall for admitting the test lamp light into the path of the view finder can be omitted when, as further provided by this invention, a pilot lamp is arranged in the view finder itself and this lamp, by suitable contacts in the mounting base of the flash unit and on the mount of the camera, is connected in parallel to the test lamp whenever the flash unit is put in place on the camera.

The invention will now be described in greater detail with reference to the accompanying drawings, in which.

Figure 1:
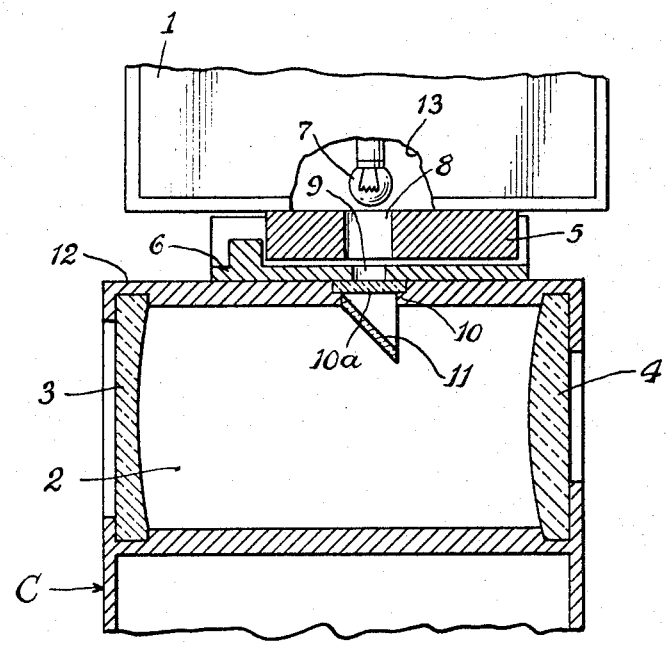
FIG. 1 illustrates diagrammatically a side view, partly in section, of a portion of a photographic camera and a flash unit in accordance with the present invention.
Figure 2:
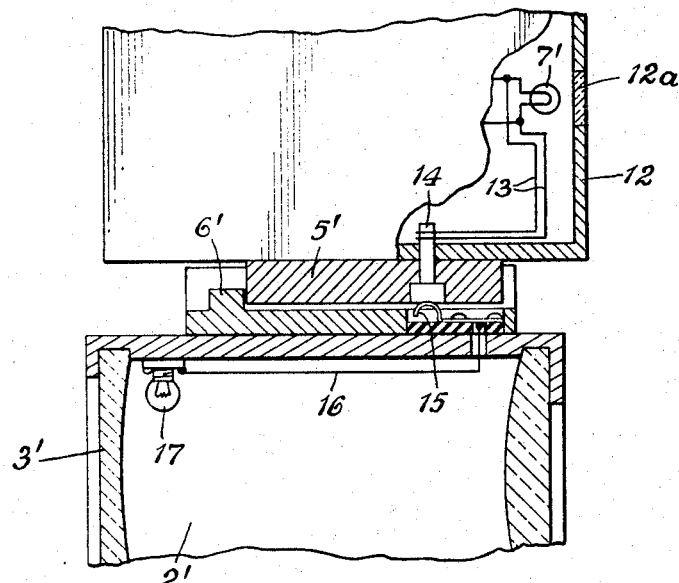
FIG. 2 illustrates in a view similar to FIG. 1 a modified embodiment of the invention.
Figure 3:
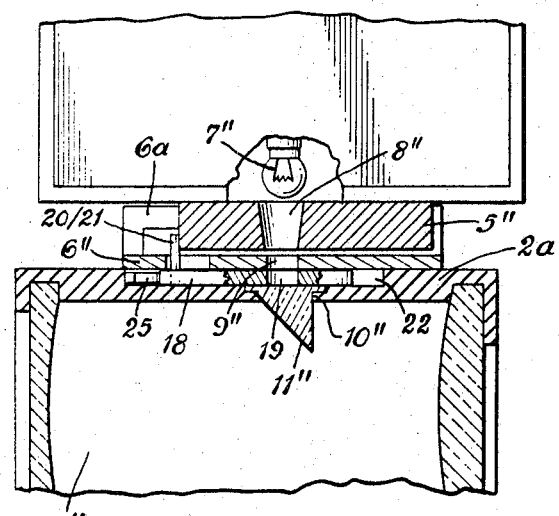
FIG. 3 illustrates in a view similar to FIG. 1 still another modified embodiment of the invention.

The FIGS. 1, 2 and 3 illustrate only that portion of the camera housing C where the built-in view finder 2 is located. According to FIG. 1, the view finder 2 includes the axially spaced finder lens 3 and the eyepiece 4. The flash unit 1 is inserted with its mounting foot 5 in the shoe 6 secured on the top wall 12 of the camera housing C on top of the view finder 2. Of the flash unit 1 only the portion close to its foot 5 is shown with a portion of the housing broken away at 13 to show the test lamp 7 which will light when the capacitor of the unit is fully charged. The lamp 7 is disposed above a bore 8 in the mounting foot 5 of the flash unit 1. In alignment with this bore 8 is arranged a hole 9 in the mounting shoe 6 and a further hole 10 is arranged in the top wall 12 of the camera housing leading into the light passage of the view finder 2. The hole 10 has preferably mounted therein a plate or layer 10a of light-transmitting material which prevents the entrance of dust and other foreign matter into the view finder. The light emanating from test lamp 7 will pass through bores or holes 8, 9, 10 and will be deflected by a mirror 11 toward the finder eyepiece 4, where it becomes visible to the observer who looks into the view finder while focusing on the subject to be photographed. The test lamp, of course, will not light until the capacitor of the flash unit is sufficiently charged, and therefore, the observer may take immediately a subsequent flash shot as soon as he notices in the finder that the lamp has lit up.

According to the embodiment illustrated in FIG. 2, the test lamp 7' is arranged in rear of a transparent window 12a provided in the rear wall 12 of the flash unit. A two-conductor cable 13 connects this test lamp 7' with a contact member 14 in the bottom wall foot 5' of the flash unit, and when the latter is in operative position in the mounting shoe 6', it engages the contact member 15 arranged in said shoe 6'. The contact member 15 by means of a conductor 16 is connected with one terminal of a test lamp 17 arranged within the view finder 2' adjacent the finder lens 3'. The other terminal of the test lamp 17 is grounded to the view finder body.

Figure 4:
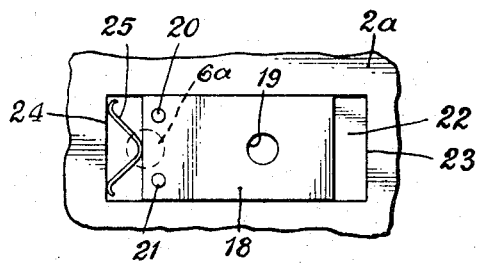
FIG. 4 is a top plan view of a portion of the top wall of the view finder with a slidable cover plate arranged in a rectangular recess.

The FIGS. 3 and 4 illustrate an embodiment of the invention in which the aperture for the passage of light from the test lamp to the interior of the view finder or camera casing is protected against the entrance of dust and/or light when the flash unit is removed from the camera and when the test lamp 7'' is arranged above the bore 8'' in the mounting foot 5''. The top wall 2a of the view finder 2'' is provided with a rectangular recess 22 in which is slidably mounted a cover plate 18. The short sides of the recess 22 are designated with 23 and 24 respectively. The cover plate 18 has a bore 19 which in the operative position of the flash unit is in alignment with the bore 8'' and the mirror or prism 11''. When the flash unit is slidably attached to the view finder, the front end of its foot 5'' engages two laterally spaced pins 20 on the cover plate 18 and move the same toward the left until the foot 5'' engages a stop pin 6a on the mounting shoe 6'', so that the bore 19 will be in alignment with the bores 8'' and 9''. When the flash unit is slidably removed from the camera, a leaf spring 25 disposed between the front side 24 and the front face of the cover plate 18 moves the latter with its bore 19 out of alignment with the aperture 10'' in the view finder housing and covers this aperture 10''.

The invention is herein described with reference to what at present are considered to be preferred embodiments thereof, but it will be apparent that changes and modifications may be made without departing from the true spirit and scope of this invention. It is, for example, immaterial where the mounting shoe for the flash unit is located, whether it is above or adjacent to the finder, or whether the flash unit is carried by the camera or by the finder housing. Within the scope of the invention, it is also immaterial in which manner the light of the flash unit test lamp is directed into the camera housing bore leading to the view finder.

What we claim is:

1. In combination with a photographic camera provided with a viewfinder and an accessory shoe, a flash unit having a test lamp and adapted to be mounted in said accessory shoe, means for causing the light of said test lamp to be visible in said viewfinder when said flash unit has been attached to said accessory shoe, said means comprising aligned apertures provided in said flash unit, said accessory shoe and said camera, and light ray deflecting means arranged adjacent the aperture in said camera for directing the light coming from said test lamp toward the viewing end of said viewfinder.

2. The combination according to claim 1, in which at least one of said apertures is covered by light-transmitting material.

3. The combination according to claim 1, said light ray deflecting means being disposed within said viewfinder, and means for automatically covering said aperture when said flash unit is removed from said camera, said means comprising a slidably mounted cover plate having a hole therein which is moved in alignment with said aperture by said flash unit when the latter is being attached to said camera.

4. The combination according to claim 1, said light ray deflecting means being disposed within said viewfinder and means for automatically covering said aperture when said flash unit is removed from said camera, said means comprising a slidably mounted cover plate having a hole therein which is moved in alignment with said aperture by said flash unit when the latter is being attached to said camera.

5. In combination with a photographic camera provided with a viewfinder and an accessory shoe, a flash unit having a first test lamp and adapted to be mounted in said accessory shoe, means for causing the light of a second test lamp to be visible in said viewfinder when said flash unit has been attached to said accessory shoe, said means including said second test lamp arranged within said viewfinder and electrical conductor means arranged to connect the first-mentioned test lamp in parallel with said second test lamp when said flash unit is inserted in said accessory shoe.

References Cited
UNITED STATES PATENTS

| | | | |
|---|---|---|---|
| 2,844,081 | 7/1958 | Wagner et al. | 95—11.5 |
| 3,068,772 | 12/1962 | MacNeille | 95—44 |
| 3,250,196 | 5/1966 | Ort et al. | 95—44 |
| 3,259,043 | 7/1966 | Pagel | 95—11 |
| 2,971,432 | 2/1961 | Blank | 352—171 |

NORTON ANSHER, *Primary Examiner.*

FRED L. BRAUN, *Assistant Examiner.*

U.S. Cl. X.R.

431—93